United States Patent [19]

Crews et al.

[11] Patent Number: 5,120,821

[45] Date of Patent: Jun. 9, 1992

[54] PROCESS FOR PRODUCING MELAMINE FORMALDEHYDE RESINS USING IMPURE MELAMINE

[75] Inventors: George M. Crews, Gonzales, La.; Shen Ji, Mississippi State, Miss.

[73] Assignee: Melamine Chemicals, Inc., Donaldsonville, La.

[21] Appl. No.: 658,885

[22] Filed: Feb. 22, 1991

[51] Int. Cl.⁵ .............................................. C08G 12/26
[52] U.S. Cl. ..................................... 528/230; 528/239; 528/254; 528/259
[58] Field of Search ................ 528/254, 259, 230, 239

[56] References Cited

U.S. PATENT DOCUMENTS

| | | | |
|---|---|---|---|
| 4,645,859 | 2/1987 | Green, II et al. | 564/38 |
| 4,663,387 | 5/1987 | Lahalith et al. | 524/843 |
| 4,797,433 | 1/1989 | Lahalith et al. | 524/3 |

Primary Examiner—John Kight, III
Assistant Examiner—Sam A. Acquah
Attorney, Agent, or Firm—Breiner & Breiner

[57] ABSTRACT

A process of producing melamine formaldehyde resins using crude or impure melamine is described. The process using the impure or crude melamine includes the control of the pH within the range of from about 8 to 10, and preferably 9 to 9.2 during at least the initial stages of the formaldehyde/melamine reaction. The pH control provides resins having commercially acceptable characteristics, with the cook times of the resin formation also being commercially acceptable.

7 Claims, No Drawings

PROCESS FOR PRODUCING MELAMINE FORMALDEHYDE RESINS USING IMPURE MELAMINE

FIELD OF INVENTION

This invention relates to a process for the production of melamine formaldehyde resins. More particularly, the invention relates to a process for the production of melamine formaldehyde resins utilizing melamine containing the impurities of the melamine manufacturing process. The improved process which controls the pH of the reaction charge permits the obtaining of satisfactory and commercially acceptable melamine formaldehyde resins, with the cook times of the manufacture also being commercially acceptable, without need to purify the melamine.

BACKGROUND OF INVENTION

Melamine formaldehyde resins are useful in the manufacture of various end products which have over the years acquired wide applications. It is recognized in the art, however, that in order to obtain melamine formaldehyde resins having good physical properties and to have a process with acceptable cook times, it is necessary to use melamine of high purity, such as that obtained through the recrystallization of crude melamine. When impure or crude melamine is utilized in the production of melamine formaldehyde resins, the properties of the resin are largely unacceptable for most applications. Moreover, the cook times, i.e., the time required for melamine formaldehyde resin to reach a predetermined end point, are substantially reduced, leading to premature gelation of the resins. Thus, it was found that in order to reproducibly control the reaction of melamine and formaldehyde, it was necessary to utilize melamine free of impurities. This requirement that a high purity melamine be used is detrimental due to the need to recrystallize the crude melamine which is an added time-consuming step that increases the cost of the melamine raw material.

SUMMARY OF INVENTION

The present invention is directed to the discovery that melamine containing manufacturing impurities such as ammeline, ammelide, ureidomelamine, melem and melam, formed during the production of melamine, can be utilized in the manufacture of melamine formaldehyde resins without detriment by carefully controlling the reaction conditions of the reaction and, in particular, keeping the pH of the reaction charge at or about 8.0 to 10 during the reaction stage. Control of the pH is particularly critical during the initial stages of reaction. By controlling the pH in at least the initial stages of reaction, it has been found that the cook time, i.e., the time required for a melamine/formaldehyde reaction to reach a predetermined end point, such as 250% water tolerance, can be substantially prolonged. Water tolerance (WT%) as used herein is the determination of a consistent end point of the reaction. A water tolerance of 250% is defined as when a 2.5 fold dilution of a sample of reaction mixture with water at 25° C. causes turbidity of the solution. Thus, $$Wt\% = (mL\ water - mL\ sample)\ (100).$$

It has also been discovered that the end melamine formaldehyde product can be enhanced by controlling the temperature during the initial stages of the reaction so as to first form methylol compounds prior to substantial polymer formation. Thus, it was found that in the formation of melamine formaldehyde resins the temperature will rise to about 90° C. before substantial polymerization reaction begins to proceed. Prior to 90° C., the primary reaction is believed to be methylol formation. It has been found that it is particularly desirable to control the pH at about 8.0 to 10, and preferably at about 9.0 to 9.5 during the temperature rise from about 30° C. to 90° C. where such methylol formation occurs. The optimum pH range is from about 9.0 to 9.2. However, the control of the pH anywhere within the range of above about 8.0 to a pH level of about 10 increases the cook time of the resin without gelation and provides resins with acceptable physical properties The invention, therefore, provides an improved process for making melamine formaldehyde resins wherein the melamine utilized is a commercial or crude grade of melamine containing the impurities produced during the melamine manufacture while obtaining the desired characteristics of a melamine formaldehyde resin substantially equivalent to the characteristics when utilizing recrystallized melamine.

DETAILED DESCRIPTION AND PRESENTLY PREFERRED EMBODIMENTS

It has been determined by analysis that crude melamine, i.e., commercially produced melamine before recrystallization, contains from about 2% to 8% impurities which are primarily ammeline, ammelide, ureidomelamine, melem, and melam. Analysis in a high-pressure liquid chromatography apparatus (HPLC) of a crude melamine sample, M-II, commercially produced by Melamine Chemicals, Inc., Donaldsonville, La., established that the sample had the following content:

| | |
|---|---|
| melamine | 95.4100 |
| ammelide | 0.0706 |
| ammeline | 0.3247 |
| ureidomelamine | 0.4294 |
| melem | 0.4209 |
| melam | 3.3400 |

A series of the M-II samples were reacted with formaldehyde using a procedure as follows: The reaction was carried out in an 0.5 liter heat-controlled vessel fitted with a reflux condenser and a mechanical stirrer. The pH value of the solution was continuously monitored by pH meter with silver chloride and glass electrode. A predetermined pH value of the initial formaldehyde was adjusted by the addition of an 0.5N solution of sodium hydroxide. One mole of M-II melamine and three moles of formaldehyde were put into the reaction vessel and heated to 90° C. with a resin heating mantle. The pH of the reaction is adjusted as needed to maintain the pH at a desired level by adding NaOH. The reaction is considered complete when the water tolerance reaches 250%. At the end of the reaction, 59 grams of ethanol are added to the reaction solution to help stabilize the reaction. Once the solution has cooled to room temperature, the viscosity is measured.

When controlling the pH as shown in Table 1, the cook time was increased, also as shown in Table 1, as follows:

TABLE 1

| pH | 6.5 | 8.5 | 8.9 | 9.0 | 9.2 | 9.3 | 9.5 |
|---|---|---|---|---|---|---|---|
| Cook Time (min*) | 4** | 121 | 173 | 179 | 197 | 194 | 173 |

*Minutes after reaching 90° C
**The resin was gelled upon cooling to 25° C

It is evident from the aforesaid data that, when the pH of the reaction system is not adjusted, the resin gelled in approximately four minutes after reaching a temperature of 90° C. Controlling or adjusting the pH as shown in Table 1 has a notable affect on the condensation reaction of melamine with formaldehyde. Thus, the increase in pH caused the cook time to increase from four minutes to a maximum of 197 minutes at a pH of 9.2. Above 9.2, the cook time started to fall off to a cook time of 173 minutes at a pH of 9.5. The resin produced at a pH above 8.5 was in all cases a commercially acceptable resin, including having an acceptable viscosity. As apparent, the resin obtained without pH adjustment was unacceptable due to its gelation.

Further experimentation has established that the control of the pH can be within the range of 8.0 to 10 to provide acceptable results. It was further shown that the pH control is particularly critical in the early stages of the reaction when the temperature is being raised to the polymerization temperature which is in the range of from about 70° C. to about 100° C. This is the temperature range at which methylol formation primarily occurs. Above the temperature of 70° C. to 100° C., the polymerization reaction is predominant; and, while the pH control beyond the polymerization reaction is effective, it is not as significant as control of the pH below such range.

It has been further found through experimentation that the impurities which predominantly adversely affect the resin cook times and the resin properties are ammelide and melam. However, as a result of the pH adjustment, it is immaterial if all of the impurities, including ammelide and melam, remain in the crude melamine. The present process avoids the need to selectively remove or remove all of the impurities. This is particularly advantageous in that the amount of the impurities varies from run to run in the commercial production of melamine.

According to the present invention, the pH can be effectively controlled by adding sodium hydroxide or other alkaline materials such as potassium hydroxide to the reaction charge. Additionally, pH control can be accomplished or enhanced by forming the salts of impurities such as the ammelides and melams. It may at times also be advantageous to use a buffer solution to help control the pH.

According to the present invention, the reaction conditions can be adjusted as is known in the art. For example, the temperature while preferably being increased to 90° C. can be increased to within the range of about 70° C. to 100° C. Further, the mole ratios of melamine to formaldehyde can be varied from about 1:1.5 to 1:3 to provide the desired resin properties.

As will be apparent to one skilled in the art, various modifications can be made within the scope of the aforesaid description. Such modifications being within the ability of one skilled in the art form a part of the present invention and are embraced by the appended claims.

What is claimed is:

1. Process for producing melamine formaldehyde resins comprising—
   (a) providing an impure melamine containing from 2% to 8% of impurities selected from the group consisting of ammeline, ammelide, ureidomelamine, melem and melam, and mixtures thereof;
   (b) admixing formaldehyde with said impure melamine;
   (c) adjusting the pH of said admixture of (a) and (b) to a pH within the range of from about 8 to 10; and
   (d) increasing the temperature of said admixture of (a) and (b) to within the range of about 70° C. to 100° C. while maintaining the pH within the range of from about 8 to 10.

2. The process of claim 1 wherein the pH of the formaldehyde is adjusted to within the range of 8 to 10 prior to admixture with the impure melamine.

3. The process of claim 1 or 2 wherein the pH is maintained within the range of 9.0 and 9.5.

4. The process of claim 1 wherein the temperature is increased to about 90° C. and the pH maintained within the said predetermined range as the reaction continues.

5. The process of claim 1 wherein the pH is maintained by adding an alkaline material.

6. The process of claim 1 wherein a salt of the impurities is first formed prior to addition of the impure melamine to formaldehyde.

7. The process of claim 1 wherein the molecular ratio of melamine to formaldehyde is from about 1:1.5 to 1:3.

* * * * *